United States Patent [19]
Rao et al.

[11] Patent Number: 5,352,549
[45] Date of Patent: Oct. 4, 1994

[54] LEAD OXIDE COMPOSITION FOR USE IN LEAD-ACID BATTERIES

[75] Inventors: Purushothama Rao, Eagan; Frederick L. Marsh, Fridley, both of Minn.

[73] Assignee: GNB Battery Technologies Inc., Mendota Heights, Minn.

[21] Appl. No.: 923,263

[22] Filed: Aug. 19, 1992

[51] Int. Cl.⁵ ............................................. H01M 4/14
[52] U.S. Cl. .................... 429/228; 429/226; 29/2
[58] Field of Search ............... 429/228, 226; 29/2

[56] References Cited

U.S. PATENT DOCUMENTS

| | | | |
|---|---|---|---|
| 2,252,104 | 8/1941 | Walde | 75/166 |
| 3,309,228 | 3/1967 | Dodson et al. | 136/56 |
| 3,723,182 | 3/1973 | Venuto | 136/26 |
| 3,809,579 | 5/1974 | Venuto . | |
| 3,990,893 | 11/1976 | Nijhawan et al. | 75/166 |
| 3,993,480 | 11/1976 | Ueberschaer et al. | 75/166 |
| 4,148,978 | 4/1979 | Winsel et al. | 429/217 |
| 4,158,563 | 6/1979 | Hebbar et al. | 429/226 X |
| 4,230,779 | 10/1980 | Varma | 429/204 |
| 4,279,977 | 7/1981 | Matter | 429/245 |
| 4,324,848 | 4/1982 | Will | 429/228 |
| 4,326,017 | 4/1982 | Will | 429/228 |
| 4,329,408 | 5/1982 | Mao et al. | 429/228 |
| 4,376,093 | 3/1983 | Prengaman | 420/573 |
| 4,456,579 | 6/1984 | Rao et al. | 420/566 |
| 4,708,918 | 11/1987 | Fitzgerald et al. | 429/210 |

*Primary Examiner*—Prince Willis, Jr.
*Assistant Examiner*—M. Nuzzolillo
*Attorney, Agent, or Firm*—Leydig, Voit & Mayer

[57] ABSTRACT

A co-doped lead oxide for use in the manufacture of storage battery plates, the use of such lead oxides improving the efficiency of lead-acid batteries, comprising, as co-dopants, based upon the total weight of the lead oxide, copper in an amount of from about 0.01 to 0.1% and either tin in an amount of from about 0.008 to 0.1% or antimony in an amount of from about 0.005 to 0.08%.

13 Claims, 1 Drawing Sheet

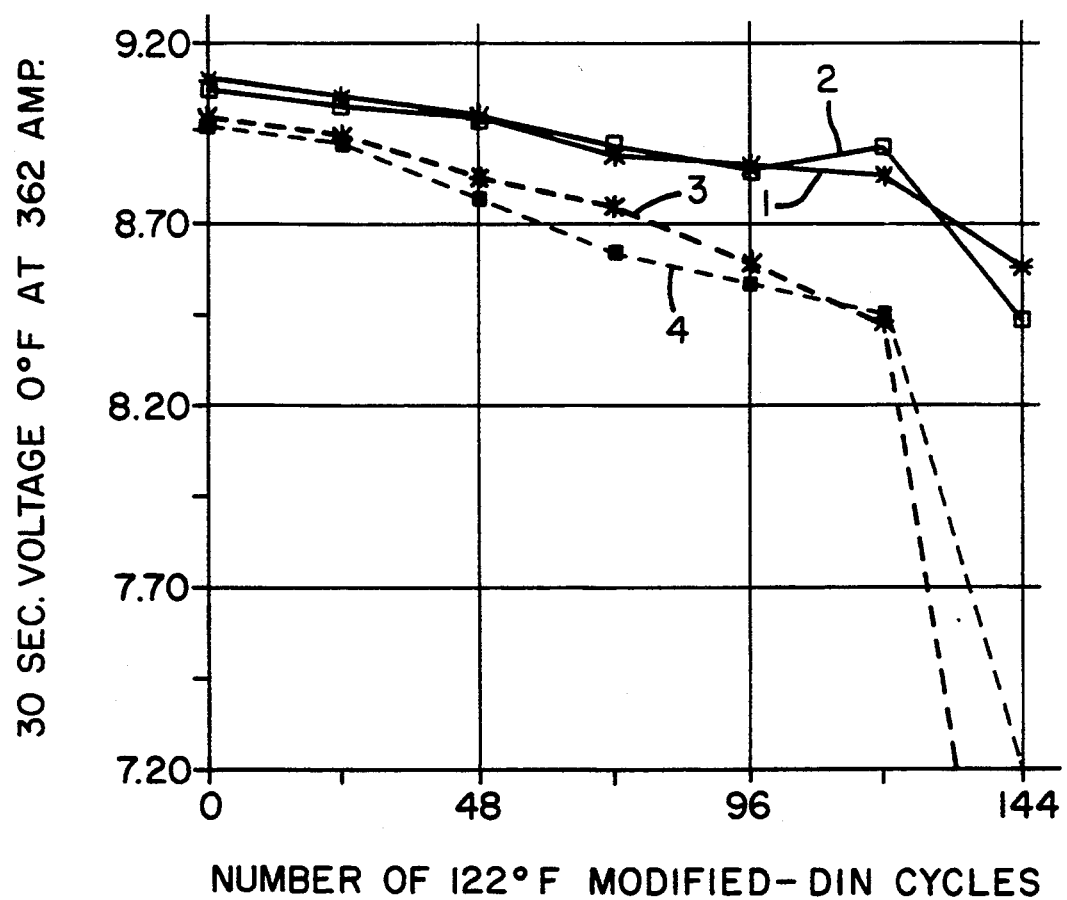

LEAD OXIDE COMPOSITION FOR USE IN LEAD-ACID BATTERIES

FIELD OF THE INVENTION

This invention relates to lead-acid storage batteries and, more particularly, to lead oxide compositions for use therein.

BACKGROUND OF THE INVENTION

From a theoretical viewpoint, the reaction which occurs at the positive plate in a lead-acid battery shows that every gram of lead dioxide should yield 0.224 ampere hour of useful electrical capacity. However, as is also well known, in actual practice only 30–50% of this capacity is realized in conventional lead-acid batteries. This relatively low efficiency remains the conventional practice despite considerable efforts to provide commercially viable ways of achieving higher efficiencies.

Likewise, the concept of doping lead oxides with particular materials to improve certain operating characteristics of lead-acid batteries has been suggested. For example, U.S. Pat. No. 3,723,182 to Venuto discloses the addition of minor amounts of a uniformly dispersed quantity of an antimony throughout the lead peroxide active material. The antimony is believed bound in a molecular array with the lead and oxygen. Batteries built with positive electrodes using such active material were shown to be free of the defects usually associated with batteries using non-antimony lead grids, including the ability to accept charge at any stage of discharge, improved capacity and cycle life equal to that of batteries having antimonial lead grids.

It is likewise known that certain impurities may also have deleterious effects on the characteristics of lead-acid batteries. For this reason, the purity of the lead oxide and sulfuric acid used in the preparation of lead sulfate paste is of particular importance since such impurities are likely to contaminate the electrolyte or active part of the battery electrode. Accordingly, impurities such as silver, copper, aluminum, iron, zinc, manganese and others which are believed to have a deleterious effect on the electrical performance of electrochemical cells are commonly carefully controlled. As an example, U.S. Pat. No. 3,788,898 to Yarnell states that such impurities should not be present in quantities greater than 0.3 mol percent.

Some investigators have also examined the possibility of increasing the copper content in alloys used for forming grids for use in lead-acid batteries. Thus, Korov and Denev, in *Metalurgiya* (Bulgaria) 1972, 27, (5) 22–25, "Investigation of the Possibilities for Increasing the Copper Content of (Lead) Battery Alloys, concluded that adding copper within a certain range to pre-eutectic lead-antimony alloys has a positive effect both on the physical and mechanical properties of the alloys, as well as on their hardness and castability. The authors further note that the significant improvement in the mechanical properties of the battery grid made using such alloys means increased stability of the battery in heavy-duty applications while the reduced rate of corrosion increases the life of the battery.

Further, various studies have likewise speculated that the active material in a lead-acid battery becomes doped by the transport of an element or elements from the grid into the oxide active material in the normal service of the battery and that this can affect the performance characteristics of the battery. In particular, Burbank, *J. Electrochem. Soc.*, Vol. 111, No. 10. page 1112, Oct. 1964, concludes that the presence of antimony in the positive grid exerts the direct and beneficial influence of causing prismatic $PbO_2$ formation in the active material and consequently aids in the retention of a firm paste texture and cell capacity in shallow cycle test.

U.S. Pat. No. 4,329,408 to Mao et al. is predicated on the discovery that the performance of lead-acid batteries can be improved by utilizing a lead oxide incorporating a minor amount of copper. At a minimum, the '408 patent teaches utilizing at least 0.01% by weight, based upon the total weight of the lead oxide, while it is preferred to utilize no more than about 0.06 or perhaps 0.07% by weight copper. While it is preferred to utilize copper as a doping agent due to the demonstrated advantages derived, Mao et al. also state that it is believed that other elements, such as lithium, bismuth, barium, phosphorous, silver, aluminum and calcium, should have similar doping effects and may be substituted for the copper, if desired. If used, the amount of such elements should not be in significant excess of the dopant-lead rich eutectic. (Column 4, lines 5–10).

The prior art also includes a number of patents disclosing alloys used for grids and the like in which the alloying ingredients include one or more of copper, antimony and tin. These include U.S. Pat. No. 2,252,104 to Walde, U.S. Pat. No. 3,309,228 to Dodson et al., U.S. Pat. No. 3,990.893 to Nijhawan et al., U.S. Pat. No. 3,993,480 to Ueberschaer et al., U.S. Pat. No. 4,158,563 to Hebbar et al., U.S. Pat. No. 4,230.779 to Varma, U.S. 4,279,977 to Matter, U.S. 4,376,093 to Prengaman, U.S. 4,456,579 to Rao et al., and U.S. 4,708,918 to Fitzgerald et al.

Despite the considerable efforts of the prior art, there remains the need to be able to provide lead oxide materials of even higher efficiency. Thus, lead-acid battery manufacturers are being called upon to provide batteries with ever-increasing efficiency. In this regard, it would be considered significant to be able to provide an efficiency increase of 6% and higher.

It is accordingly a principal object of the present invention to provide a novel lead oxide capable of imparting improved performance characteristics to lead-acid batteries having active material made from such an oxide.

A related and more specific object provides a lead oxide capable of achieving increased efficiency of oxide utilization in a lead-acid battery using such an oxide.

Yet another object lies in the provision of the novel oxide capable of increasing, in a lead-acid battery using such an oxide, the electrical conductivity of the system so as to provide lower internal resistance and thus higher power output.

A still further object of this invention is to provide a lead oxide capable of imparting improved cycle life to lead-acid batteries using such an oxide.

Another object provides a lead oxide which can be readily made by techniques commonly employed for making conventional lead oxides.

Other objects and advantages of the present invention will become apparent as the following description proceeds.

SUMMARY OF THE INVENTION

In general, the present invention is predicated on the discovery that the performance of lead-acid batteries can be improved by utilizing a lead oxide incorporating, as co-dopants, a minor amount of copper together with either tin or antimony. The use of these co-dopants provides a synergistic effect, imparting improvements in a variety of battery electrical performance characteristics when such batteries use such oxides. Among the electrical performance characteristics that are improved are low and high rate discharge capacities and cold cranking rates.

The amount of the copper employed, based upon the total weight of the lead oxide, can range from about 0.01 to 0.1% by weight, with a level of 0.04 to 0.08% being preferred. When present, the amount of tin can vary from about 0.008 to about 0.1% by weight, with the range of 0.025 to 0.075% by weight being preferred. The amount of antimony employed, when present, should be within the range of from about 0.005 to about 0.08% by weight, with a range of 0.01 to 0.06% by weight being preferred.

BRIEF DESCRIPTION OF THE DRAWING

The sole figure is a graph of the cold cranking volts versus numbers of modified DIN-type cycles and showing the cold cranking performance of the use of the co-doped lead oxides in accordance with the present invention in comparison to batteries utilizing commercially used lead oxides.

DETAILED DESCRIPTION OF THE INVENTION

It is not known that whether the copper and antimony or tin actually enter into the Pb-O lattice and displace some of the lead atoms, or whether such co-dopant atoms are filling the interstitial voids in the structure of the lead oxide material, or if there is some other explanation. However, based upon experimental observations, it is believed that the resulting lead oxide material is other than a simple physical admixture. Accordingly, the terminology "co-doped lead oxide" will be used herein to describe the novel oxide of the present invention utilizing, as co-dopants, copper and either tin or antimony, so as to distinguish from mere physical admixtures.

The co-doped lead oxides of the present invention may be prepared by any of the techniques known for making lead oxides which may be used in lead-acid battery applications. Of course, the particular technique should be modified to insure that a co-doped lead oxide will result rather than a simple physical admixture.

As an example of one method for making the co-doped lead oxides, a Barton pot is commonly used commercially to form lead oxides for lead-battery applications. This technique is quite economical and provides oxides with satisfactory properties, viz., leady oxides with about 20–25% by weight lead metal. In this technique, a draft of air is forced down upon the surface of a continuous stream of molten lead droplets, forming lead oxides. As the lead oxides form, they are continuously drawn off. The typical product from this process has a high degree of oxidation, i.e., leady oxide, and is in the form of a very fine powder. The co-doped lead oxides of the present invention may be made using this technique by feeding a lead alloy with the appropriate amounts of copper and either tin or antimony into the Barton pot.

Among the other techniques known, are those that use a ball mill. Thus, pieces of lead are ground against each other in a ball mill in the presence of air to produce an oxide having a high content, generally, of unoxidized lead. To form the co-doped lead oxides of the present invention, copper and either tin or antimony can be alloyed with lead and then introduced into the ball mill.

It is also known in the art to form lead oxides by using chemical coprecipitation. Chemical coprecipitation may thus also be used to form the co-doped lead oxides of the present invention. Thus, for example, this could be carried out by coprecipitation from a solution containing, lead, copper, and either tin or antimony, and then converting the coprecipitate to their respective oxides. The thus-produced co-doped lead oxide may itself be used as the starting active material for the electrodes in lead-acid batteries or such oxides may be blended with other lead oxide materials produced via other means.

The particular process used to form the co-doped lead oxides of the present invention will depend upon, in part, the type of lead oxide desired for the particular type of application as well as, of course, the economics of the situation. However, regardless of which method is used, it should be appreciated that the level of impurities present in the lead or other materials used in preparing the co-doped lead oxides of the present invention should be sufficiently low to insure that the function of the copper and either tin or antimony in the co-doped lead oxide is not significantly adversely effected. It is believed that this can be suitably achieved by insuring that any impurities present are in amounts on the order of those found in typical commercially available raw materials used in making lead oxides for electrochemical applications, such as, for example, refined lead.

The amounts of the co-dopants utilized are relatively small. Accordingly, if desired, a masterbatch can be prepared in which the amounts of the co-dopants are well in excess of the levels needed. The appropriate levels can then be obtained by blending the masterbatch with enough other material to form the lead oxides with the requisite amounts of the co-dopants.

As to the amounts of the co-dopants used to form the lead oxides of the present invention, the minimum level should be that necessary to provide the desired enhancement in the electrical performance characteristics of the batteries utilizing such co-doped lead oxides. In general, as has been previously noted, the minimum levels range from about 0.01% by weight, based upon the total weight of the lead oxide, for copper, while tin should be employed in an amount of about, at least, 0.008% by weight, and antimony should be utilized in an amount of at least about 0.005% by weight.

The maximum level utilized may depend, in part, upon the level of solubility of the particular dopant in solid solution. Thus, when excessive levels of the dopants are utilized, it is possible that migration out of the lead oxides will take place in battery service thus causing, in some instances, deleterious effects. In general, it will be desired to utilize copper in an amount of no more than about 0.1% by weight, based upon the total weight of the oxide, while using no more than about 0.1% by weight of tin and no more than about 0.08% by weight antimony. As previously discussed, the preferred ranges for the dopants are from 0.04 to 0.08% by weight copper, from 0.025 to 0.075% by weight tin, and from 0.01 to 0.06% by weight antimony.

The advantages resulting from use of the co-doped lead oxides are thus obtained, when, in the appropriate amounts, copper together with either tin or antimony are employed, as has been described herein. However, if desired, the co-doped lead oxides of this invention may incorporate both tin and antimony.

The co-doped lead oxides of the present invention may be formed into a paste; and the plates pasted, cured and formed. Suitable techniques for each of these steps are well known in the art and may be used. The particular techniques do not form a part of this invention. Likewise, the construction of the battery and the various components may be any of the myriad which are known. The particular battery construction thus does not form a part of the invention.

However, among the various types of grid alloys used, it is preferred, in general, to utilize the co-doped lead oxides of the present invention with grid alloys used in maintenance-free batteries. Any of a variety of alloys of this type are known and may be employed. It is particularly preferred to utilize non-antimony containing lead alloys. As an illustrative example, it is useful to employ lead-calcium-tin alloys.

The following Example is illustrative, but not a limitation, of the present invention. Unless otherwise indicated, all percentages are by weight.

EXAMPLE 1

This Example illustrates the preparation of the co-doped lead oxides of the present invention and the performance data of batteries using such co-doped lead oxides in comparison with other lead oxides.

A lead alloy containing the following levels of alloying ingredients were cast into ¾ inch balls: Co-doped lead oxide A (copper dopant level of 639 ppm and tin dopant level of 495 ppm), and co-doped lead oxide B (dopant level of copper of 671 ppm and dopant level of antimony of 108), and copper-doped lead oxide (a copper dopant level of 809 ppm). In addition, ¾ inch balls were cast from lead alloys having only a residual copper level of 83 ppm. These balls were introduced into a milling vessel chamber and were milled under a time-temperature program until the leady oxide particles were reduced in size to a typical battery oxide range.

The surface areas of these various lead oxides (as well as two known lead oxides as controls) were as set forth in Table I as well as the per cent lead metal for the various lead oxides utilized:

TABLE I

| OXIDE TYPE | Surface Area m²/gm | Pb Metal, % |
| --- | --- | --- |
| Co-doped Lead Oxide A | 2.6–2.8 | 27–30 |
| Co-doped Lead Oxide B | 2.6–2.8 | 27–29 |
| Copper-Doped Lead Oxide | 2.6 | 28 |
| Lead Oxide (residual copper) | 2.7 | 29 |
| Control A | 1.35 | 25 |
| Control B | 1.35 | 25 |

Matching gravity cast positive grids of a lead alloy containing 0.1% calcium and 0.5% tin, both being based upon the weight of the alloy, were pasted with the various oxides using a standard paste formulation, were cured in a 1.5 hour 215° F. autoclave steam regime and were dried overnight (viz., for about 26 hours) at 125° F. Batteries containing these positive plates were then assembled, subjected to a 20-hour formation, and then tested. Matched commercially used negative plates of a calcium-tin-lead alloy were used for all batteries.

The batteries built were Group 58 batteries having 13 plates (6 positive plates/7 negative plates per cell) with a nominal 20-hour capacity rating of 58 Ampere-Hours (AH), a Reserve Capacity rating of 100 minutes and a Cold Cranking rate of 540 Amps. Additional data regarding these batteries is set forth in Table II, the weights being in grams and the surface areas being in square inches:

TABLE II

| | |
| --- | --- |
| Positive grid weight | 52.0 |
| Negative grid weight | 38.0 |
| Unformed positive paste weight per plate | 88.0 |
| Unformed negative paste weight per plate | 73.0 |
| Total positive surface area per cell | 283 |
| Individual plate surface area (two sides) | 47.2 |

The results of the electrical data obtained are set forth in TABLE III, each value set forth being the average of data for three batteries unless otherwise noted:

TABLE III

| Oxide Type | 80° F. 25 A Discharge Minute | 80° F. 3.1 A Discharge A - Hour | 0° F. Discharge at 540 Amps | | | −20° F. Discharge at 300 Amps | |
| --- | --- | --- | --- | --- | --- | --- | --- |
| | | | 5 Sec. V | 30 Sec. V | Time to 6 V-Sec. | 10 Sec. V | Time to 5 V-Sec. |
| Co-doped Lead Oxide A | 123.2 | 69.8 | 8.58 | 8.22 | 93.8 | 9.27 | 148.5 |
| Co-doped Lead Oxide B | 117.6 | 67.8 | 8.59 | 8.23 | 93.7 | 9.25 | 148.8 |
| Copper-Doped Lead Oxide | 109.2 | 64.0 | 8.62 | 8.10 | 84.0 | n.d.[1] | n.d. |
| Lead Oxide (residual copper) | 108.4 | 62.7 | 8.62 | 8.10 | 78.2 | n.d. | n.d |
| Control A | 112.1 | 66.0 | 8.57 | 8.14 | 84.3 | 9.27 | 115.3 |
| Control B[2] | 105.8 | 64.5 | 8.49 | 7.97 | 66.2 | 9.26 | 88.7 |

[1] n.d. — not determined under matching conditions
[2] four batteries averaged

As can be seen, the batteries containing the co-doped lead oxides of the present invention offered enhanced performance levels over those obtained with using other lead oxides at most ranges of the electrical performance characteristics set forth. Thus, at the 80° F., 3.1 Amp discharge rate (viz., a C/20 rate), the use of the copper-tin co-doped lead oxide in batteries delivered 9.5% more capacity per gram of oxide than the matching control batteries. Further, at the 80° F., 25 Amp discharge rate, utilizing the novel copper-tin co-doped lead oxide imparted to the resulting batteries about 17.8% more capacity per gram of oxide than the control batteries from the early cycling data provided. Still further, the data of TABLE III demonstrate that the use of the novel co-doped lead oxides imparts to the resulting batteries substantially greater cranking times at 0° F. and −20° F. when compared to the control and reference batteries.

These batteries, after the initial electrical performance testing, were also subjected to a 122° F. modified DIN cycle test. These batteries were subjected to 24 cycles per week. Each cycle consisted of a discharge, at 122° F., of 31 Amps for 0.5 hours, followed by a chargeback also at 122° F., of 31 Amps for 2.50 hours at a limiting voltage of 14.8 Amps. Performance was monitored by using two-thirds of the cold crank rating of the batteries at 0° F. (The cold crank rating of the batteries employed was 540 Amps.) The batteries were discharged at 362 Amps and 0° F., and the voltage output was measured at 30 seconds. When the 30 second voltage fell below 7.2 volts, the test was terminated.

The results are shown in the sole figure. Curve 1 shows batteries using co-dopant lead oxide A, and the Curve 2 shows the results of the batteries cycles using co-doped lead oxide B. Curves 3 and 4 represent the performance of batteries using the control lead oxides A and B, respectively. As can be seen, the use of the co-doped lead oxides of the present invention provides what are considered to be significant improvements in performance of the batteries using such oxides. The batteries using the control lead oxides failed before 144 cycles had been achieved, and the test was terminated as to those batteries. In contrast, after 144 cycles, the batteries using the co-doped lead oxides of this invention were still sustaining, the 30-second voltage being well in excess of 7.2 volts.

We claim:

1. A co-doped lead oxide for use in the manufacture of storage battery plates having grids which comprises a co-doped lead oxide wherein the co-dopants comprise, based upon the total weight of the lead oxide, copper in an amount of from about 0.01 to 0.1% and tin in an amount of from about 0.008 to 0.1%.

2. The co-doped lead oxide of claim 1 wherein copper is present in an amount of 0.04 to 0.08%.

3. The co-doped lead oxide of claim 1 wherein tin is present in an amount of 0.025 to 0.75%.

4. The co-doped lead oxide of claim 1 wherein antimony is present in an amount of from about 0.005 to 0.08%.

5. The co-doped lead oxide of claim 4 wherein antimony is present in an amount of 0.01 to 0.06%.

6. A lead-acid storage battery having a plurality of lead oxide-pasted plates having grids, at least some of said plates being formed from co-doped lead oxide wherein the co-dopants comprise, based upon the total weight of the lead oxide, copper in an amount of from about 0.01 to 0.1% and tin in an amount of from about 0.008 to 0.1%.

7. The storage battery of claim 6 wherein copper is present in an amount of 0.04 to 0.08%.

8. The storage battery of claim 6 wherein tin is present in an amount of 0.025 to 0.075%.

9. The storage battery of claim 6 wherein antimony is present as a co-dopant in an amount of from about 0.005 to 0.08%.

10. The storage battery of claim 9 wherein antimony is present in an amount of 0.01 to 0.06%.

11. A method for improving the capacity of a lead-acid storage battery having a plurality of lead oxide-pasted plates having grids which comprises co-doping the lead oxide used for making at least some of the pasted plates with, based upon the total weight of the lead oxide, copper in an amount of from about 0.01 to 0.1% and tin in an amount of from about 0.008 to 0.1%.

12. The method of claim 11 wherein tin is present in an amount of 0.025 to 0.075%.

13. The method of claim 11 wherein antimony is present as a co-dopant in an amount of from about 0.005 to 0.08%.

* * * * *

UNITED STATES PATENT AND TRADEMARK OFFICE
CERTIFICATE OF CORRECTION

PATENT NO. : 5,352,549

DATED : OCTOBER 4, 1994

INVENTOR(S) : PURUSHOTHAMA RAO AND FREDERICK L. MARSH

It is certified that error appears in the above-identified patent and that said Letters Patent is hereby corrected as shown below:

Column 2, line 28, delete the "." in patent number "3,990.893" and substitute therefor -- , --; and Column 2, line 30, delete the "." in patent number "4,230.779" and substitute therefor -- , --.

Column 7, line 35, delete "0.75" and substitute therefor -- 0.075 --.

Signed and Sealed this

Twenty-seventh Day of December, 1994

Attest:

BRUCE LEHMAN

*Attesting Officer*     *Commissioner of Patents and Trademarks*